United States Patent [19]
Dokmo et al.

[11] Patent Number: 5,223,066
[45] Date of Patent: Jun. 29, 1993

[54] TAPE WRAPPING OFFSET DEVICE

[75] Inventors: Richard C. Dokmo, Barrington, Ill.; Spencer D. Cottam, Salt Lake City, Utah

[73] Assignee: T C Manufacturing Co., Inc., Evanston, Ill.

[21] Appl. No.: 893,982

[22] Filed: Jun. 5, 1992

[51] Int. Cl.$^5$ .............................................. B31C 3/00
[52] U.S. Cl. .................................... 156/188; 156/432; 156/584; 156/247; 156/195
[58] Field of Search ............... 156/190, 195, 184, 187, 156/188, 247, 249, 392, 432, 428, 289, 584

[56] References Cited

U.S. PATENT DOCUMENTS

| | | |
|---|---|---|
| 1,504,255 | 8/1924 | MacDonald . |
| 2,716,315 | 8/1955 | Jacoby . |
| 3,404,050 | 10/1968 | Gill .................................. 156/195 X |
| 3,616,007 | 10/1971 | Anderson . |
| 3,850,729 | 11/1974 | Paulson ........................... 156/184 X |

Primary Examiner—David A. Simmons
Assistant Examiner—Charles Rainwater
Attorney, Agent, or Firm—Lee, Mann, Smith, McWilliams, Sweeney & Ohlson

[57] ABSTRACT

A method and apparatus for wrapping the liner of a tape, which has been peeled from the backing of a tape, around a pipe or other object in the same operation that the backing is applied. The apparatus includes a frame having at least two spaced apart bars which direct the path of the liner to an offset position which is parallel to and behind the portion of the backing which is currently being applied to the pipe. The liner is then wrapped around the pipe over the backing which has been wrapped around the pipe just in advance of the liner. The liner may also be perforated or otherwise treated before application to the pipe.

15 Claims, 2 Drawing Sheets

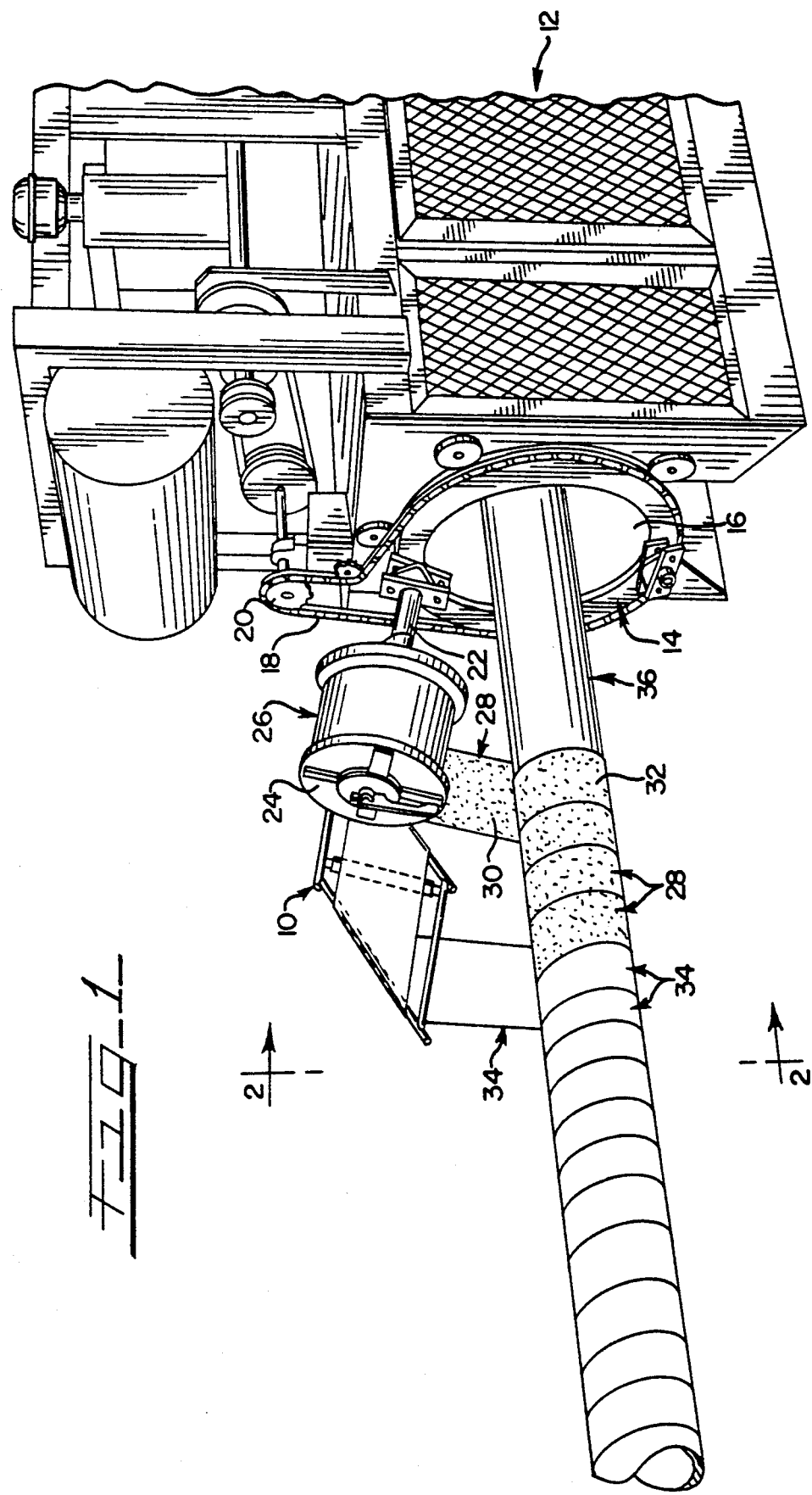
FIG_1

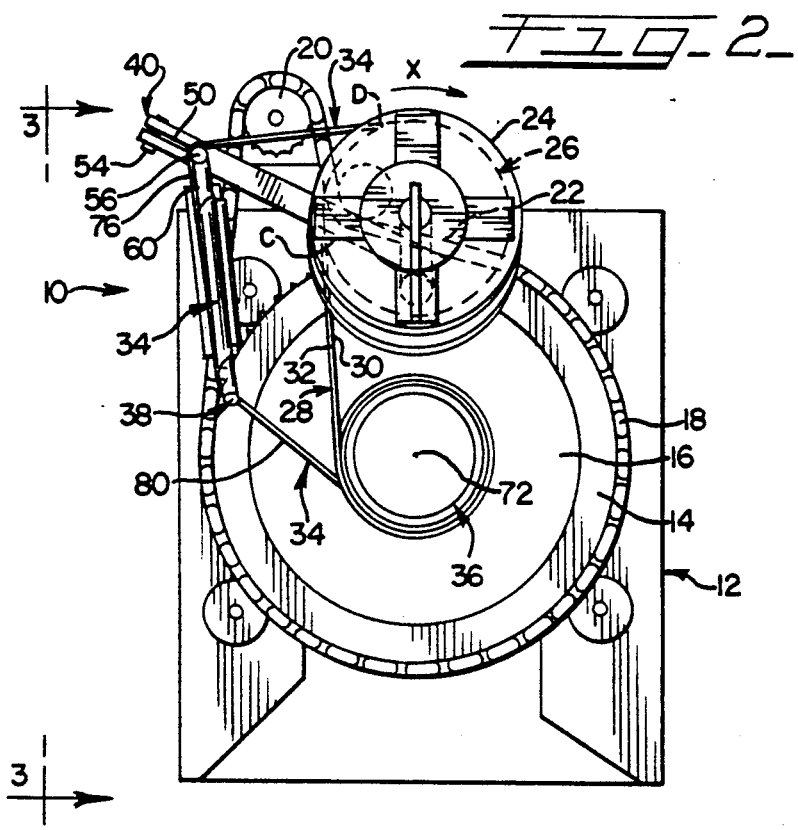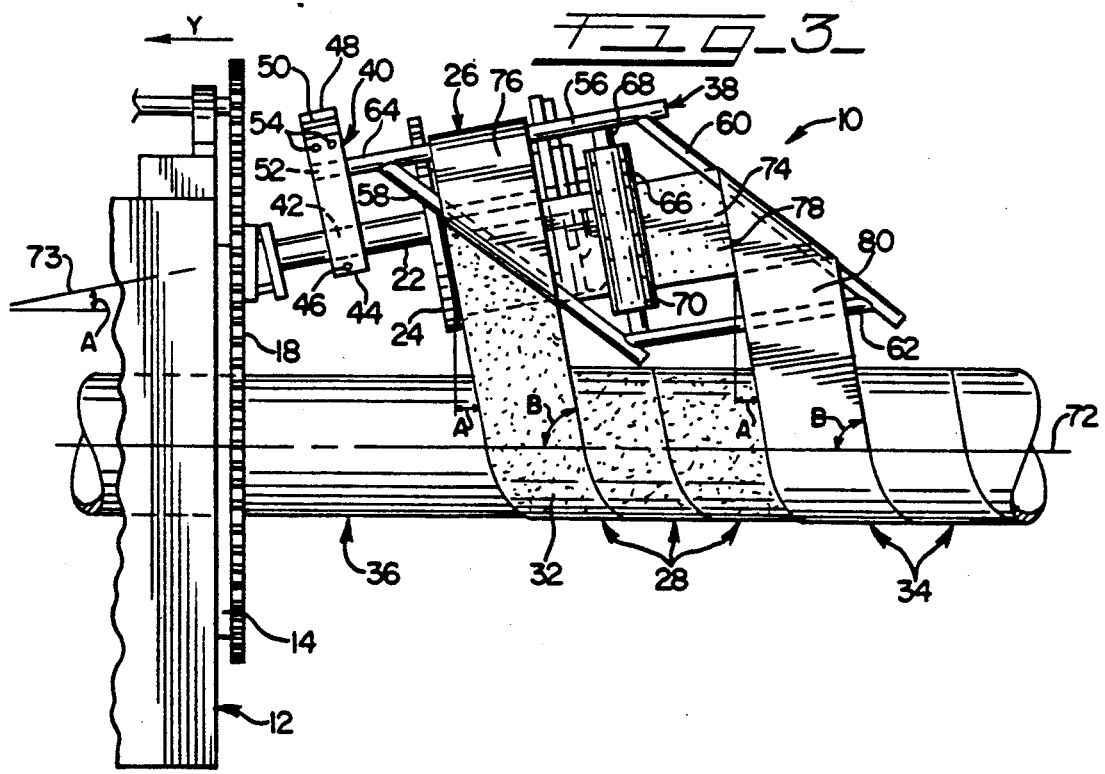

TAPE WRAPPING OFFSET DEVICE

BACKGROUND OF THE INVENTION

The present invention relates to methods and apparatus used for wrapping a tape continuously around and along a pipe in a spiral manner and in particular to methods and apparatus for wrapping a tape including a backing and a liner around a pipe. Pipelines, pipes and other elongate members have been externally covered with a tape for many years. The tapes used for wrapping a pipe include a backing material to which an adhesive is applied to one face of the backing. The tape backing is manufactured in various materials, thicknesses and widths which vary according to the pipeline operating conditions. The tackiness of the adhesive which is applied to the backing also varies. It is common for tapes with a very aggressive adhesive to have a releasable liner applied to the adhesive face of the backing before the tape is wound into a roll on a spool. The liner prevents the adhesive side of the backing from adhering to the non-adhesive side of the backing when the tape is wound into a roll.

Previously when a tape, which included a backing and a liner, was used to wrap a pipeline, the liner would be peeled from the backing and would be discarded as the backing was spirally wrapped around the pipe. Because of the difficulty of handling the liner after removal from the backing, only tapes without a liner were seriously considered for coating pipelines when the tape was to be applied with a motorized tape wrapping machine. In those few instances where a tape with a liner was applied to a pipeline with a motorized tape wrapping machine, the liner would be wound up on a take-up reel and later discarded. Liners have not previously been applied to and wrapped around a pipeline to contribute to the performance of the tape backing and to the further protection of the pipeline.

SUMMARY OF THE INVENTION

The present invention provides a method and apparatus for wrapping the liner of a tape around a pipe or other elongate member in the same operation that applies the backing. The liner is wrapped over the portion of the backing of the tape which has just previously been applied to the pipe in advance of the liner. The apparatus includes a frame which is attached to a tape wrapping machine. As the backing of the tape is applied to the pipe, the liner which has previously been separated from the backing travels through the frame such that the liner is offset behind and parallel to the portion of the backing which is currently being applied to the pipe. The liner is then wrapped around the pipe over the previously applied backing at the same rate as the backing is being wrapped around the pipe. A roller having a plurality of pins located on its surface is provided within the frame for perforating the liner as the liner travels through the frame.

DESCRIPTION OF THE DRAWINGS

FIG. 1 is a perspective view of a tape wrapping machine having the tape wrapping offset device attached thereto.

FIG. 2 is a side elevational view taken along lines 2—2 of FIG. 1.

FIG. 3 is a rear elevational view taken along lines 3—3 of FIG. 2.

DESCRIPTION OF THE PREFERRED EMBODIMENT

FIG. 1 shows the tape wrapping offset device 10 attached to a tape wrapping machine 12. The tape wrapping machine 12 may be of any standard type and includes a ring 14 having a central aperture 16. The ring 14 is externally geared to receive a chain 18. The chain 18 is connected to a drive sprocket 20. A shaft 22 extends from the ring 14 and supports a spool 24 of tape 26. The tape 26 includes a backing 28 having an adhesive face 30 and a non-adhesive face 32. A liner 34 is releasably bonded to the adhesive face 30 of the backing 28. While the liner 34 may be made of many different materials, the liner 34 is preferably made of a material having a slick or slippery surface to facilitate the peeling or release of the liner 34 from the adhesive face 30 of the backing 28. The liner 34 is preferably white or a light color suitable for reflecting heat. The liner 34 may be of various thicknesses, may include printed matter, and may have a coating such as an adhesive or an aluminized coating. A pipe 36 or other elongate member extends through and is centered within the aperture 12 of the tape wrapping machine 12. The drive sprocket 20 and the chain 18 rotate the ring 14 around the pipe 36 in a clockwise direction as shown by the arrow X in FIG. 2. The rotation of the ring 14 revolves the spool 24 of tape 26 around the pipe 36.

As best shown in FIG. 3 the tape wrapping offset device 10 includes a frame 38 which is connected to the shaft 22 of the tape wrapping machine 12 by an arm 40. The shaft 22 extends through an aperture 42 within a first end 44 of the arm 40. The first end 44 of the arm 40 is clamped securely in place to the shaft 22 of the tape wrapping machine 12 by a fastener 46. A second end 48 of the arm 40 includes a slot 50 and a round aperture 52. A portion of the frame 38 fits within the aperture 52 and is securely clamped in position with fasteners 54.

The frame 38 includes a top bar 56, a left bar 58, a right bar 60 and a bottom bar 62. The bars 56 and 58 are attached to, and extend outwardly from, the top bar 56 at an angle of approximately 45° to the bar 56. The bottom bar 62 extends between the left bar 58 and the right bar 60. The top bar 56 and the bottom bar 62 are spaced apart parallel to one another and the left bar 58 and the right bar 60 are spaced apart parallel to one another. The top bar 56 includes a stem 64 which extends past the point where the left bar 58 is connected to the top bar 56 for insertion into the aperture 52 of the arm 40. As can be seen, the bars 56, 58, 60 and 62 are connected together in the general shape of a parallelogram. A roller 66 is rotatably attached to a shaft 68 which is connected to the top bar 56 and the bottom bar 62 at right angles thereto. The roller 66 includes a plurality of pins 70 spaced around the exterior surface of the roller 66. While the frame 38 described herein is in the general shape of a parallelogram having sides angled at approximately 45°, other shapes and configurations may be used. Each of the bars 56, 58, 60 and 62 may additionally include one or more rollers (not shown) to facilitate the travel of the liner 34 through the frame 38.

As best shown in FIG. 3, the shaft 22 of the tape wrapping machine 12 is set at an angle A to the longitudinal axis 72 of the pipe 36. The spool 24 rotates about a rotational axis 73 as tape 26 is unwound from the spool 24. The rotational axis 73 corresponds to the longitudinal axis of the shaft 22. The angle at which the shaft 22 and the rotational axis 73 of the spool 24 is placed with respect to the axis 72 of the pipe 36 will determine the angle at which the backing 28 will be applied and spirally wound around the pipe 36. As shown in FIG. 3, when the rotational axis 73 of the spool 24 is set at an angle A, the backing 28 will be applied to the pipe 36 at an angle B from the longitudinal axis 72 of the pipe 36, wherein angle B equals 90° minus the angle A. The liner 34 is applied to the pipe 36 at the same angle B as is the backing 28. The liner 34 and the backing 28 are applied to the pipe 36 at the same angle so that the tacking 28 and the liner 34 will be applied to the pipe 36 at equal rates.

As the tape 26 is unwound from the spool 24, the liner 34 is peeled from the adhesive face 30 of the backing 28 at point C as shown in FIG. 2. The backing 28 is wrapped around the pipe 36 with the adhesive face 30 being applied to the pipe 36. The backing 28 is applied to the pipe 36 at an angle B to the longitudinal axis 72 of the pipe 36 which is perpendicular to the rotational axis 73 of the spool 24. The liner 34, after being separated from the backing 28, continues to wrap around the spool 24 to a point D as shown in FIG. 2. As the liner 34 is unwound from the spool 24, a first portion 76 of the liner 34 extends from point D and is wrapped over the top bar 56 whereupon the first portion 76 extends downwardly to the left bar 58. The first portion 76 of the liner 34 is perpendicular to the rotational axis 73 of the spool 24. The liner 34 is partially wrapped around the left bar 58. A second portion 78 of the liner 34 extends from the left bar 58 to the right bar 60. The second portion 78 of the liner 34 extends substantially parallel with the rotational axis 73 of the spool 24. When the liner 34 was partially wrapped around the left bar 58, the direction of travel of the liner 34 was changed from a direction perpendicular to the axis 73, in which the first portion 76 of the liner 34 travels, to a direction which is substantially parallel to the rotational axis 73 in which the second portion 78 of the liner 34 travels. The liner 34 is then wrapped partially around the right bar 60. A third portion 80 of the liner 34 extends from the right bar 60, is wrapped over the bottom bar 62, and is then applied to the pipe 36 over the backing 28. The third portion 80 of the liner 34 extends substantially perpendicular to the second portion 78 and the rotational axis 73 and extends substantially parallel to the first portion 76 of the liner 34 and the backing 28 which is being applied to the pipe 36. When the liner 34 was wrapped partially around the right bar 60, the direction of travel of the liner 34 was changed from a direction parallel to the axis 73, in which the second portion 78 of the liner 34 travels, to a direction perpendicular to the axis 73 in which the third portion 80 of the liner 34 travels.

As can be seen in FIG. 3, the frame 38 offsets the liner 34 a distance behind the portion of the backing 28 which is currently being applied to the pipe 36. The distance of the offset between the backing 28 and the third portion 80 of the liner 34 may be varied as desired by changing the spacing between the left bar 58 and the right bar 60. The directions of travel, in which the various portions of the liner 34 travel, may be varied and additional changes in direction of the liner 34 may be incorporated. However, the liner 34 is preferred to be applied to the pipe 36 at the same angle as the backing 28 is applied so that both components of the tape 26 are applied at the same rate along the longitudinal axis 72 of the pipe 36.

In operation, the tape wrapping machine 12 will rotate the spool 24 around the pipe 36 simultaneously wrapping the backing 28 and the liner 34 around the pipe 36. As the backing 28 and the liner 34 are being applied to the pipe 36, the tape wrapping machine will advance in the direction shown by the arrow Y in FIG. 3 to compensate for the advancement of the backing 28 and the liner 34 along the pipe 36 due to the spiral wrapping. As the spool 24 continues to rotate around the pipe 36, the liner 34 will continue to be peeled from the adhesive face 30 of the backing 28 and will continue to travel through the frame 38. As the liner 34 passes between the bars 58 and 60 of the frame 38, the liner 34 will pass over the roller 66. As the liner 34 passes over the roller 66, the pins 70 will create uniformly spaced perforations 74 in the liner 34. The spacing of the perforations 74 may be varied by changing the diameter of the roller 66 or the spacing of the pins 70 thereon. The perforations 74 act to prevent cathodic shielding when cathodic protection is being used. The liner 34 may also include an adhesive coated face to bond the liner 34 to the backing 28. Where a liner 34 having an adhesive coated face is used, it may not be desireable to perforate the liner 34.

The tape wrapping offset device 10 enables the backing 28 and the liner 34 of a tape 26 to be applied to the pipe 36 with the same speed as a linerless tape may be applied to a pipe. The liner 34 is put to a productive use enabling all of the components of the tape 26 to become and form the protective coating system which is applied to the pipe 36. As the liner 34 is constructed of a slippery material, the liner 34 will decrease the potential for soil adherence to the pipe 36 and will reduce soil induced stresses in the liner wrapped pipe 36. The liner 34 which is preferably white also serves as a reflective barrier for providing ultraviolet light protection and for keeping the pipe 36 cooler during construction and installation than what it otherwise would be if the normally dark colored backing 28 were to be the outermost layer on the pipe 36. The liner 34 also adds an additional layer of protection to the abrasion and corrosion protection system of the pipe 36.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. An apparatus for wrapping the liner of a tape which has been separated from a backing of the tape around the backing which has previously been wrapped around an elongate member, said apparatus comprising:
   first means for changing the direction of travel of said liner from a first direction in which a first portion of said liner is traveling said liner is separated from the backing to a second direction in which a second portion of said liner is traveling; and
   second means for changing the direction of travel of said liner from said second direction of said second portion to a third direction in which a third portion of said liner is traveling, said third portion of said liner being wrapped around said member over said backing.

2. The apparatus of claim 1 wherein said third portion of said liner is offset a selected distance from said first portion of said liner.

3. The apparatus of claim 1 wherein said tape is wound in a spool, said spool being rotatable about an axis of said spool.

4. The apparatus of claim 3 wherein said first portion of said liner and said third portion of said liner are substantially perpendicular to said axis of said spool.

5. The apparatus of claim 1 wherein said first means comprises a first bar, said first bar being disposed at an angle to the direction of travel of said first portion of said liner, said first bar being adapted to permit said liner to partially wrap around said first bar.

6. The apparatus of claim 5 wherein said second means comprises a second bar, said second bar being disposed at an angle to the direction of travel of said second portion of said liner, said second bar being adapted to permit said liner to partially wrap around said second bar.

7. The apparatus of claim 6 wherein said first bar and said second bar are parallel.

8. The apparatus of claim 1 wherein said first means comprises a first roller, said first roller being disposed at an angle to the direction of travel of said first portion of said liner, said first roller being adapted to permit said liner to partially wrap around said first roller.

9. The apparatus of claim 8 wherein said second means comprises a second roller, said second roller being disposed at an angle to the direction of travel of said second portion of said liner, said second roller being adapted to permit said liner to partially wrap around said second roller.

10. The apparatus of claim 9 wherein said first roller and said second roller are parallel.

11. The apparatus of claim 1 additionally comprising perforating means for perforating said liner.

12. The apparatus of claim 11 wherein said perforating means comprises a roller, and a plurality of pins extending from said roller.

13. A method of wrapping a backup and a liner of a tape around an elongate member comprising the steps of:
   supplying a spool of tape, said tape having a backing and a liner;
   unwinding said tape from said spool;
   separating said liner from said backing;
   wrapping said backing around said member;
   offsetting said liner a distance from said backing which is being wrapped around said member; and
   wrapping said liner around said member over said backing.

14. The method of claim 13 additionally comprising the step of perforating said liner.

15. The method of claim 13 wherein said backing and said liner are wrapped around said member at equal rates.

* * * * *